(12) United States Patent
Grantham et al.

(10) Patent No.: US 12,479,397 B2
(45) Date of Patent: Nov. 25, 2025

(54) GRILLE SHUTTERS WITH ACTIVE UPPER LOAD PATH AND VEHICLES INCLUDING SAME

(71) Applicant: Toyota Motor Engineering & Manufacturing North America, Inc., Plano, TX (US)

(72) Inventors: Haley L. Grantham, Saline, MI (US); Aaron R. Steinhilb, Milan, MI (US); Troy N. Grantham, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 108 days.

(21) Appl. No.: 18/438,970

(22) Filed: Feb. 12, 2024

(65) Prior Publication Data
US 2025/0256678 A1    Aug. 14, 2025

(51) Int. Cl.
*B60R 21/34*        (2011.01)
*B62D 35/00*        (2006.01)

(52) U.S. Cl.
CPC .................................... *B60R 21/34* (2013.01)

(58) Field of Classification Search
CPC ................................ B60R 21/34; B62D 35/00
See application file for complete search history.

(56) References Cited

U.S. PATENT DOCUMENTS

| | | | |
|---|---|---|---|
| 11,648,835 B2 | 5/2023 | Srivastava et al. | |
| 2012/0090906 A1* | 4/2012 | Charnesky | B60K 11/085 180/68.1 |
| 2014/0216834 A1* | 8/2014 | Elliott | B60K 11/085 180/68.1 |
| 2021/0323397 A1* | 10/2021 | Iorga | B60K 11/085 |
| 2023/0278417 A1* | 9/2023 | Minero Ramales | B60K 11/085 180/68.1 |

FOREIGN PATENT DOCUMENTS

| | | |
|---|---|---|
| CN | 212827875 U | 3/2021 |
| CN | 115091942 A | 9/2022 |
| KR | 102519534 B1 | 4/2023 |

* cited by examiner

*Primary Examiner* — Tan Q Nguyen
(74) *Attorney, Agent, or Firm* — Dinsmore & Shohl LLP

(57) ABSTRACT

A vehicle includes an active grille shutter system including an actuation frame and grille fins that extend between opposite sides of the actuation frame. The grille fins each include a fin body rotatably connected to the actuation frame and a fin extension movably connected to the fin body such that the fin extension moves from a stowed configuration to a deployed configuration relative to the fin body. An actuation device is configured to move the fin extension from the stowed configuration to the deployed position thereby adding to a length of the fin body.

20 Claims, 4 Drawing Sheets

GRILLE SHUTTERS WITH ACTIVE UPPER LOAD PATH AND VEHICLES INCLUDING SAME

TECHNICAL FIELD

The present specification generally relates to vehicles with grill shutters, and more specifically, grille shutters with an active load path for improved pedestrian leg impact test results.

BACKGROUND

Vehicles may be equipped with bumper assemblies and impact protection structures that elastically and plastically deform to absorb energy in the event of an impact. A number of standards and tests currently exist. Various organizations have introduced a number of pedestrian regulations and rating criteria for automotive vehicles. As one example, test methods have been developed to assess the protection of an adult pedestrian by simulating leg-impact conditions during a car-to-pedestrian impact.

Accordingly, vehicle front end structures are desired that provide improved energy absorption under pedestrian leg impact testing conditions.

SUMMARY

In one embodiment, a vehicle includes an active grille shutter system including an actuation frame and grille fins that extend between opposite sides of the actuation frame. The grille fins each include a fin body rotatably connected to the actuation frame and a fin extension movably connected to the fin body such that the fin extension moves from a stowed configuration to a deployed configuration relative to the fin body. An actuation device is configured to move the fin extension from the stowed configuration to the deployed position thereby adding to a length of the fin body.

In another embodiment, an active grille shutter system includes an actuation frame and grille fins that extend between opposite sides of the actuation frame. The grille fins each include a fin body that is rotatably connected to the actuation frame and a fin extension movably connected to the fin body such that the fin extension moves from a stowed configuration to a deployed configuration relative to the fin body. An actuation device is configured to move the fin extension from the stowed configuration to the deployed position thereby adding to a length of the fin body.

In another embodiment, a method of increasing a load path between an active grille shutter system and a front of a vehicle is provided. The method includes moving a plurality of grille fins from a closed configuration to an open configuration using a motor. A fin extension of at least one of the plurality of grille fins is moved from a stowed configuration to a deployed configuration to add to a length of a fin body of the at least one of the plurality of grille fins.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include active grille shutter systems that include an actuation frame and grille fins that extend between opposite sides of the actuation frame. An active grille shutter system, as used herein, refers to a system that is disposed in a front grille area of the vehicles that is used to adjust the amount of outside air that is introduced into an engine compartment of the vehicles by automatically moving the grille fins to control air flow. The grille fins each include a fin body rotatably connected to the actuation frame and a fin extension movably connected to the fin body such that the fin extension moves from a stowed configuration to a deployed configuration relative to the fin body. An actuation device is configured to move the fin extension from the stowed configuration to the deployed position thereby adding to a length of the fin body.

It has been observed that high bumper vehicles, such as trucks and SUVs, can provide reduced reaction force during leg impact testing in the femur and/or tibia regions. The grill shutter systems described herein may be used to increase an upper and/or lower longitudinal load path to provide increased reaction forces in the femur and/or tibia regions of the vehicle.

Figure 1:
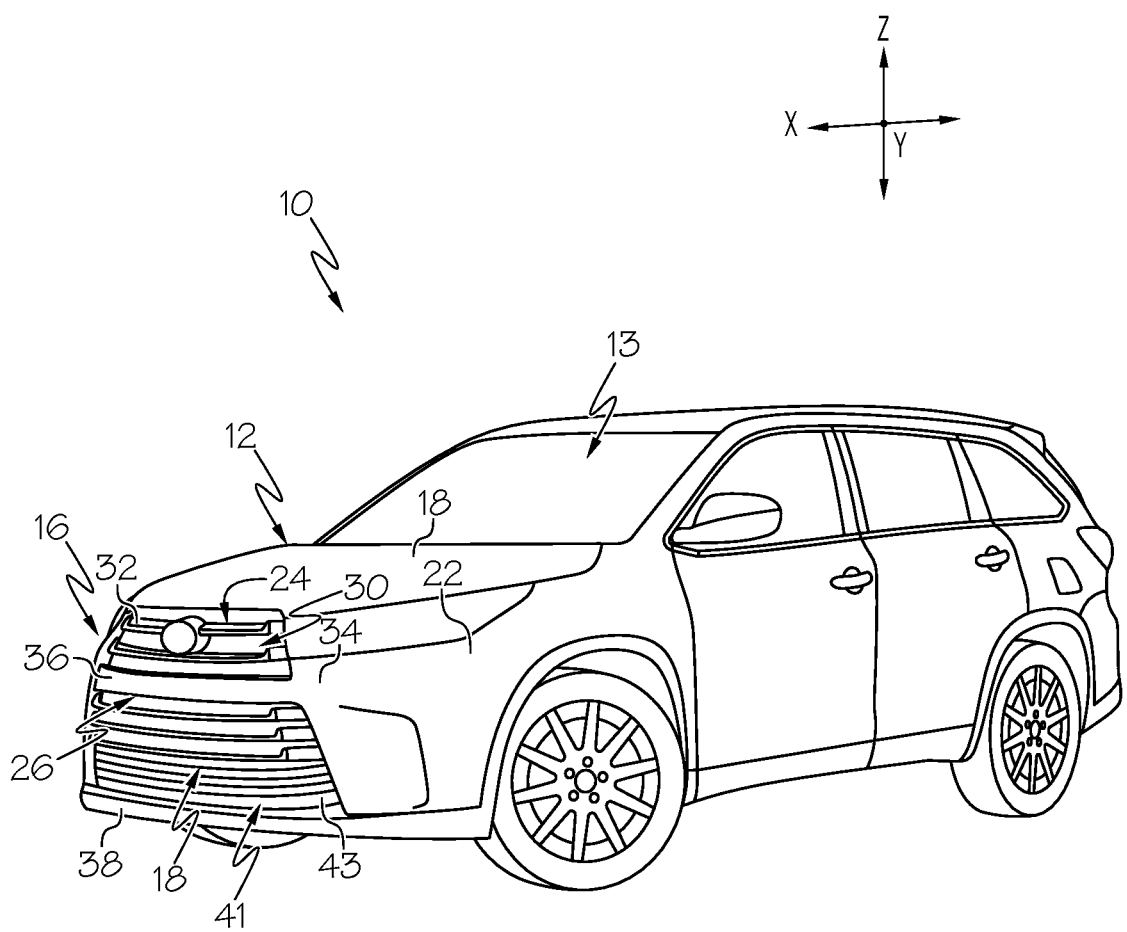
FIG. 1 schematically depicts a perspective view of a vehicle, according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of an outward component away from a vehicle centerline. The term "inboard" or "inward" as used herein refers to the relative location of an inward component toward the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle 10.

Referring initially to FIG. 1, a vehicle 10 includes a vehicle body 12 and a cabin 13 that is integral with the vehicle body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 includes a covering portion 30 with a number of grille deflectors 32, a mesh or other suitable covering that protects a radiator behind the covering portion 30, while allowing air to flow past the covering and over the radiator. The front end assembly 16 includes an outer covering or front fascia 34, an upper projecting bumper portion 36 and a lower projecting bumper portion 38 that under hangs the upper projecting bumper portion 36. The lower grille assembly 28 may include a covering portion 41 with a number of grille deflectors 43 and be located between the upper projecting bumper portion 36 and the lower projecting bumper portion 38.

Figure 2:
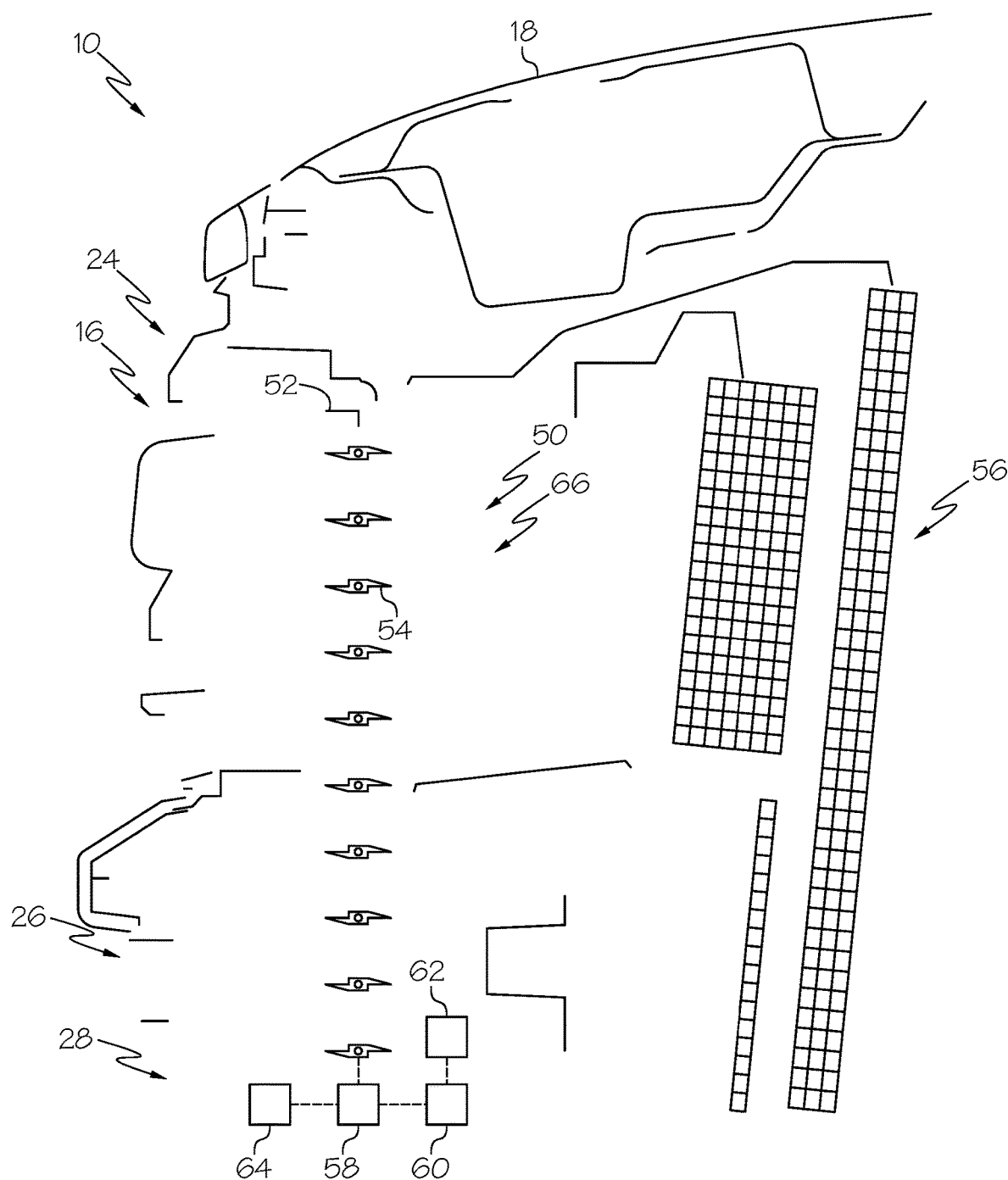
FIG. 2 illustrates a side section view of a front portion of the vehicle of FIG. 1, according to one or more embodiments shown or described herein.

Referring to FIG. 2, a diagram schematically illustrating the vehicle 10 is shown and includes the front end assembly 16 that includes the hood 18, the upper grille assembly 24, the lower grille assembly 28 and the front bumper assembly 26 located between the upper and lower grille assemblies 24 and 28. An active grille shutter system 50 includes a fin actuation frame 52 and a plurality of grille fins 54 that is rotatably connected to the fin actuation frame 52. The fin actuation frame 52 and associated grille fins 54 are located between the upper and lower grille assemblies 24 and 28 and a radiator 56 of the vehicle 10. A motor 58 may be operatively connected to the fin actuation frame 52 for providing power to actuate the grille fins 54 between open and closed configurations. The motor 58 may be driven based on control by an electronic control unit (ECU) 60 of the vehicle 10. The ECU 60 may be connected to one or more sensors 62 that provide a signal that is indicative of an operating condition of the vehicle 10, such as engine temperature, environmental temperature, velocity of the vehicle 10, state of charge of a vehicle battery (SOC), coolant temperature, etc.

As can be seen in FIG. 2, a space 66 is provided in a front area of the vehicle 10 between the front end assembly 16 and the radiator 56, above and below where the front bumper assembly 26 (FIG. 1) is located. This space 66 can provide a relatively low reaction forces in the femur and/or tibia regions of the vehicle 10 during leg impact testing compared to the bumper region. To reduce the space 66 and provide increased reaction forces during leg impact testing, the grille fins 54 may be provided with fin extensions that extend a length of a fin body 68 of the grille fins 54.

Figure 3:
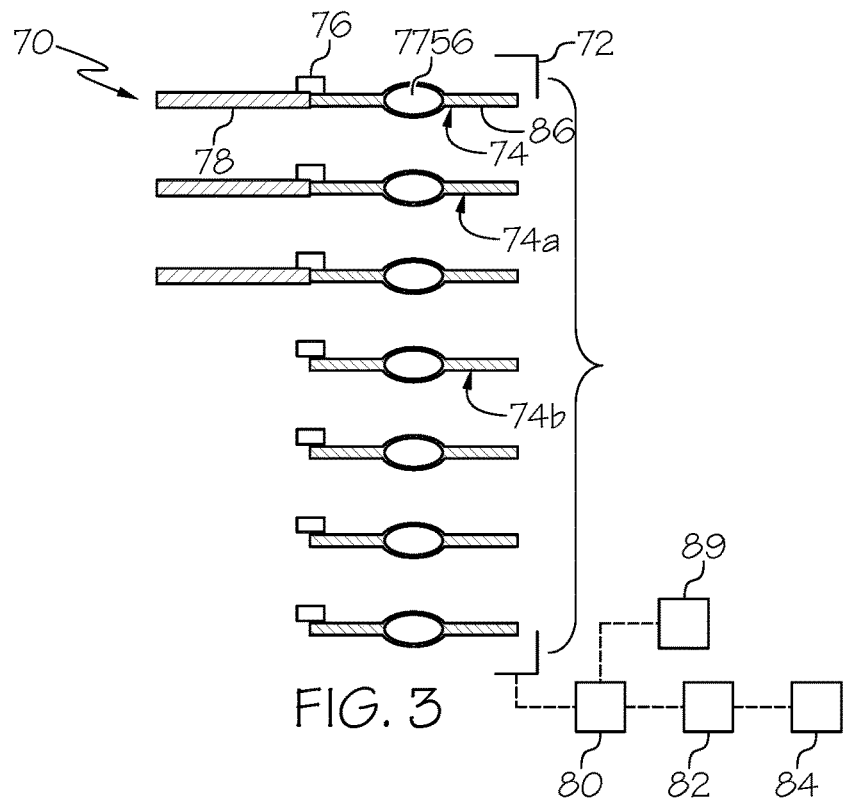
FIG. 3 schematically depicts an embodiment of an active grille shutter system including grille fins with extension portions, according to one or more embodiments shown and described herein.

Referring to FIG. 3, an active grille shutter system 70 configured for use in the vehicle 10 includes a fin actuation frame 72 and a plurality of grille fins 74 that is rotatably connected to the fin actuation frame 72 at pivot locations 75. A motor 80 may be operatively connected to the fin actuation frame 72 for providing power to actuate the grille fins 74 between open and closed configurations. The motor 80 may be driven based on control by an electronic control unit (ECU) 82 of the vehicle. The ECU 82 may be connected to one or more sensors 84 that provide a signal that is indicative of an operating condition of the vehicle, such as engine temperature, environmental temperature, velocity of the vehicle, state of charge of a vehicle battery (SOC), coolant temperature, etc.

One or more, such as all the grille fins 74 includes a fin body 86 and a fin extension 88 that is movably connected to the fin body 86. The fin extension 88 may be formed out of any suitable material, such as metal, plastic, or combinations thereof. The fin extension 88 may be movably connected to the fin body 86 using any suitable connection, such as a pivot location, track, etc. such that the fin extension 88 can move relative to the fin body 86 between stowed and deployed configurations. For example, grille fin 74a is illustrated in the deployed configuration to provide a grille fin 74a of extended length and grille fin 74b is illustrated in the stowed configuration to provide a grille fin 74b of reduced length. An actuation device 76 is provided to actuate the fin extension 88. Any suitable actuation device 76 may be used, such as a hinge-motor, rail-motor combinations, etc. The actuation device 76 may be controlled by the ECU 82 based on a signal from a sensor 89 configured to detect presence of an obstacle, such as a pedestrian, such as LIDAR, RADAR or other types of motion/object detection sensors. Image recognition may be used to determine the type of obstacle and whether or not to deploy the fin extensions 88. For example, if the image recognition system determines that a detected object is a person, the ECU 82 may instruct the actuation devices 76 to deploy their respective fin extensions 88. If the detected object is determined to be something other than a person, the ECU 82 may not instruct the actuation devices 76 to deploy their respective fin extensions 88. Depending on characteristics of the detected object, the ECU 82 may instruct which ones of the actuation devices 76 to deploy their respective fin extensions 88.

Figure 4:
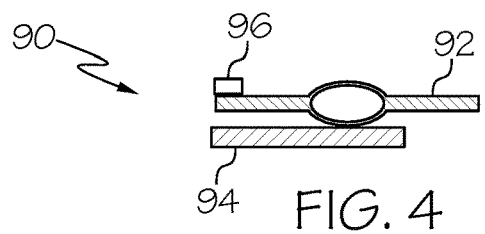
FIG. 4 schematically illustrates an embodiment of a grille fin including fin extension, according to one or more embodiments shown and described herein.
Figure 5:
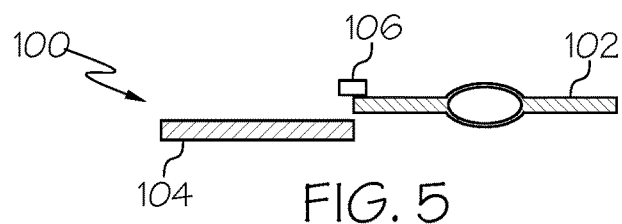
FIG. 5 schematically illustrates an embodiment of a grille fin including fin extension, according to one or more embodiments shown and described herein.
Figure 6:
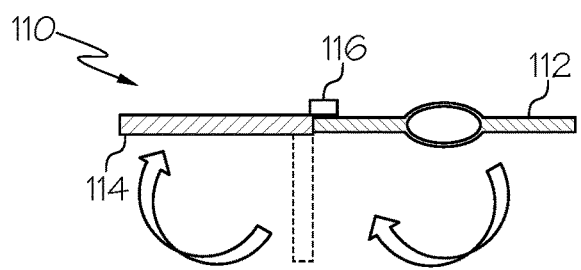
FIG. 6 schematically illustrates an embodiment of a grille fin including fin extension, according to one or more embodiments shown and described herein.

FIGS. 4 and 5 illustrates an example of a grille fin 90 with a fin body 92 and a fin extension 94 that rests alongside the fin body 92 when in the stowed configuration. As above, an actuation device 96 can be used to move the fin extension 94 relative to the fin body 92 from the stowed configuration to the deployed configuration. For example, in one embodiment shown in FIG. 5, a grille shutter 100 includes a fin body 102 and a fin extension 104. In this embodiment, an actuation device 106 moves the fin extension 104 forward and then upward into the deployed configuration. In another example shown by FIG. 6, an actuation device 116 rotates a fin extension 114 of the grille shutter 110 relative to a fin body 112 into a deployed configuration. It should be noted that the actuation devices may be used to move the fin extensions from the deployed configuration back to the stowed configuration, resetting for their continued use. However, the fin extensions and fin bodies may need replaced after the fin extensions are deployed and used.

Figure 7:
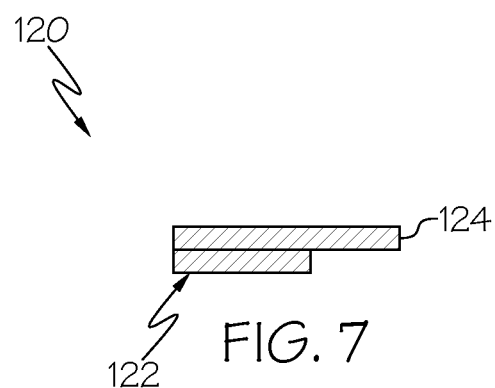
FIG. 7 schematically illustrates an embodiment of a fin extension, according to one or more embodiments shown and described herein.
Figure 8:
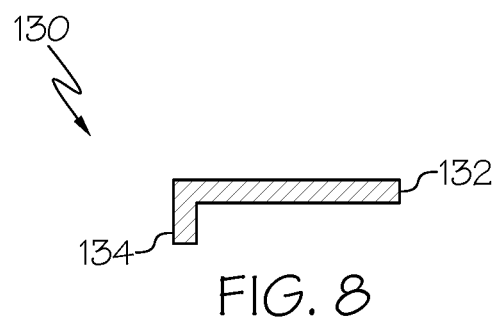
FIG. 8 schematically illustrates an embodiment of a fin extension, according to one or more embodiments shown and described herein.

The fin extensions may have any suitable shape. As one example, referring to FIG. 7, a fin extension 120 is provided of varying thickness including a narrow portion 124 and a thicker portion 122. As another example, FIG. 8 shows a fin extension 130 that includes an extension portion 132 and an end arm portion 134 that extends outward from the extension portion 132.

The above-described active grill shutter systems include a fin actuation frame and a plurality of grille fins that include fin extensions that can be used to extend lengths of the grille fins. Extending the lengths of the grille fins can help to reduce a space between a front end of a vehicle and the fin actuation system, which can increase a load path during leg impact testing and reduce bending in the tibia and femur test regions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
an active grille shutter system comprising:
an actuation frame;
grille fins that extend between opposite sides of the actuation frame, the grille fins each include a fin body rotatably connected to the actuation frame and a fin extension movably connected to the fin body such that the fin extension moves from a stowed configuration to a deployed configuration relative to the fin body; and
an actuation device that is configured to move the fin extension from the stowed configuration to the deployed position thereby adding to a length of the fin body.

2. The vehicle of claim 1, wherein the actuation device comprises a motor.

3. The vehicle of claim 2, wherein the motor is controlled by an electronic control unit (ECU).

4. The vehicle of claim 3 further comprising a sensor that is configured to provide a signal to the ECU based on an operating condition of the vehicle.

5. The vehicle of claim 3, wherein the ECU controls operation of the actuation device based on input from a sensor.

6. The vehicle of claim 5, wherein the sensor comprises an object detection sensor.

7. The vehicle of claim 1, wherein the active grille shutter system comprises a motor configured to open and close the grille fins.

8. The vehicle of claim 1, wherein the fin extension if configured to slide relative to the fin body from the stowed configuration to the deployed configuration.

9. The vehicle of claim 1, wherein the fin extension is configured to rotate relative to the fin body from the stowed configuration to the deployed configuration.

10. The vehicle of claim 1, wherein the fin extension comprises an end portion that is greater in thickness than a second end portion.

11. The vehicle of claim 1, wherein the fin extension comprises an extension portion and an arm portion that extends outward from the extension portion.

12. An active grille shutter system comprising:
an actuation frame;
grille fins that extend between opposite sides of the actuation frame, the grille fins each include a fin body rotatably connected to the actuation frame and a fin extension movably connected to the fin body such that the fin extension moves from a stowed configuration to a deployed configuration relative to the fin body; and
an actuation device that is configured to move the fin extension from the stowed configuration to the deployed position thereby adding to a length of the fin body.

13. The active grille shutter system of claim 12, wherein the actuation device comprises a motor.

14. The active grille shutter system of claim 12, wherein the active grille shutter system comprises a motor configured to open and close the grille fins.

15. The active grille shutter system of claim 12, wherein the fin extension if configured to slide relative to the fin body from the stowed configuration to the deployed configuration.

16. The vehicle of claim 12, wherein the fin extension is configured to rotate relative to the fin body from the stowed configuration to the deployed configuration.

17. The active grille shutter system of claim 12, wherein the fin extension comprises an end portion that is greater in thickness than a second end portion.

18. The active grille shutter system of claim 12, wherein the fin extension comprises an extension portion and an arm portion that extends outward from the extension portion.

19. A method of increasing a load path between an active grille shutter system and a front of a vehicle, the method comprising:
moving a plurality of grille fins from a closed configuration to an open configuration using a motor; and
moving a fin extension of at least one of the plurality of grille fins from a stowed configuration to a deployed configuration to add to a length of a fin body of the at least one of the plurality of grille fins.

20. The method of claim 19, wherein the step of moving the fin extension includes moving the fin extension using an actuation device.

* * * * *